United States Patent
Lee

[11] Patent Number: 5,901,267
[45] Date of Patent: May 4, 1999

[54] OPTICAL FIBER HAVING CONTINUOUS SPOT-ILLUMINATION

[76] Inventor: Jean Hway Lee, P. O. Box 82-144, Taipei, Taiwan

[21] Appl. No.: 08/856,766

[22] Filed: May 15, 1997

[51] Int. Cl.$^6$ ....................................................... G02B 6/04
[52] U.S. Cl. ........................... 385/901; 385/102; 385/115
[58] Field of Search ............................... 362/32; 385/901, 385/102, 104, 109, 111, 115, 116

[56] References Cited

U.S. PATENT DOCUMENTS

| | | | |
|---|---|---|---|
| 4,471,412 | 9/1984 | Mori | 362/32 |
| 5,301,090 | 4/1994 | Hed | 362/32 |
| 5,539,624 | 7/1996 | Dougherty | 362/32 |

*Primary Examiner*—Hung N. Ngo
*Attorney, Agent, or Firm*—A & J

[57] ABSTRACT

An optical fiber having continuous spot-illumination thereupon, wherein the continuous illumination spot are realized by cutting away a plurality of cladding from the fiber till exposes the core under the micro-windows and let the light wave guided within the core emit form those micro-windows, therefore, this fiber can provide uniform radial illumination in spot manner.

1 Claim, 4 Drawing Sheets

OPTICAL FIBER HAVING CONTINUOUS SPOT-ILLUMINATION

FIELD OF THE INVENTION

The present invention relates to an optical fiber having continuous spot-illumination, more particularly, to an optical fiber which can provide continuous and uniform spot-illumination along its outer surface and can be advantageously employed for decoration purpose.

BACKGROUND OF THE INVENTION

Christmas light bulb plays a significant role in the decoration lighting market. However, the conventional Christmas light bulbs have some problems. For example, it is haunted by the problem of safety caused by its physical arrangement, lack of the ability of saving electrical power and hard to manipulate the exhibiting color. For the bulbs connected in series and used in decoration situation, the whole series of bulbs will be extinguished if only one of those lamps has problem. This problem will be more serious for those decorating lighting bulbs used in outdoor decoration, for those bulbs in such situation are liable to be deteriorated by a bad weather.

To overcome above problems, the present invention provides an optical fiber which has a plurality of micro-windows alone its outer surface, the light guided along the optical fiber can come out from those micro-windows in radial direction as it travels to those micro-windows to provide a uniform illumination in spot-like manner.

An optical fiber generally consists of a cylinder core of silica glass or plastic materials surrounded by a cladding whose refractive index is lower than that of the core and can be used in the field of data transmission, guided wave device, optical fiber sensor and decoration application. For a step-index plastic optical fiber, its has a core made of PMMA Polymethyl methacrylate and a cladding made of fluorinated polymer, and has excellent extension property and flexibility.

Referring to FIG. 1, this figure shows a step-index optical fiber and is used to explain the principle of guiding light wave for an optical fiber. The incident light is launched into the core of the optical fiber which is a homogeneous and has a larger refractive index, and the core is surrounded by a cladding which has a lower refractive index. By the principle of total internal reflection, the light launched into the core within a small angle will be reflected on the interface of the core and the cladding. That is, the light will be bounced forth and back within the core, in other word, be guided within the core. For a step-index plastic optical fiber, it has a thick core and a thin cladding. For example, in an optical fiber of 750 $\mu$m diameter, the core has diameter of 735±45 $\mu$m, and the cladding with the core has total thickness of 750±45 $\mu$m.

Above discussion shows that the guidance of light wave in an optical fiber is realized by the total internal reflection occurred on the interface of the core and the cladding, which have different values of refractive index. By the principle of ray optics, the light wave will be guided losslessly alone the core if the light wave is launched into the core within a small angle. That is, the angle is such small that the condition of total internal reflection can be realized. However, there exists propagation loss in the optical fiber due to the imperfection in the materials and the structure of the optical fiber.

As to the mechanism accounting for the propagation loss of the optical fiber, there are the inherent absorption loss for the fiber materials. Taking fiber with an absorption loss of 0.2 dB/km as an example, the optical fiber will lose 7% of its light energy after a 2 meter propagation. Besides the inherent absorption loss in optical fiber, there are also the scattering loss due to the impurity and bulb generated during the pulling process of the optical fiber, the loss caused by the imperfection in the shape of the core . . . etc. FIG. 2 shows the relationship between the guided wave energy and the propagation distance for optical fibers to explain the effect of the propagation loss.

Because the light wave is not guided perfectly in real situation, there exists light wave scattered from the surface of the optical fiber. The scattered light can be employed for decoration purpose. However, for the optical fiber having above propagation loss mechanism can only illuminate weak or diversified light alone its surface and provide spot light only at its end, so it does meet the requirement of decoration satisfactorily. For a high propagation loss fiber, there might be more light wave emitting out of fiber in radial direction, however, the illumination is not uniform.

To solve the above problem, the present invention provide a fiber having continuous and uniform spot-like illumination, which can be advantageously employed in the field of decoration lighting.

The present invention provides a fiber having a radial illumination effect along a effective propagation distance, said fiber has a plurality of micro-windows cut in its outer surface, light can be illuminated from the micro-window as long as there is light launched into the fiber within the acceptance angle thereof.

More particularly, this invention use automatically-controlled and high-precision cutting means to machine the optical fiber, which cuts away a plurality of tiny region of the cladding and exposes those part of the core t under the opening. Therefore, the light wave guided within the core can illuminate uniformly from those opening if they incident to the opening.

The accompanying drawings, which are included to provide a further understanding of the invention and are incorporated in and constitute a part of this specification, illustrate embodiments of the invention and together with the description serve to explain the principle of the invention:

Assuming that the optical fiber has a diameter of 750 $\mu$m, the core has diameter of 735±45 $\mu$m, and the cladding with the core has total thickness of 750±45 $\mu$m. The optical fiber is machined by cutting means of high-precision to cut away a plurality pieces of the cladding and form micro-windows along the surface of the optical fiber. The micro-windows thus formed can provide an effective radial illumination other than that provided by the propagation loss discussed above. In other word, those windows provide more uniform and brighter illumination. Nevertheless those windows introduce an additional loss term to the optical fiber. To compensate the additional loss term, an optical fiber having smaller propagation loss can be used.

Figure 1:
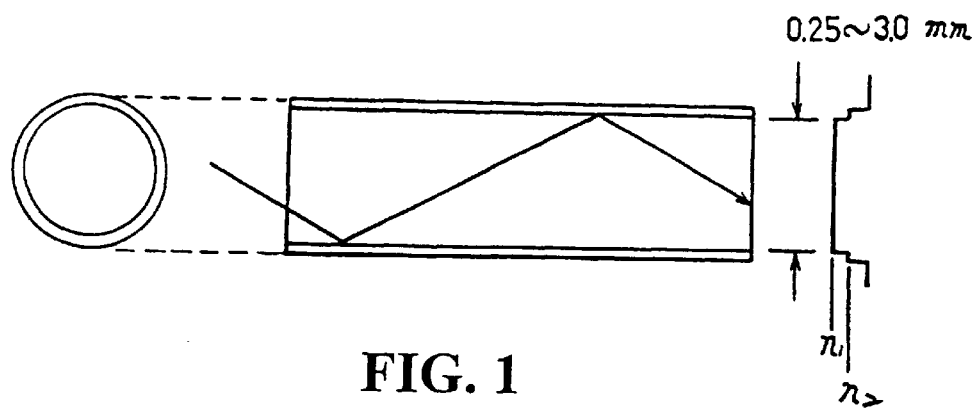
FIG. 1 is a perspective views showing the structure and light wave propagation of the plastic optical fiber.
Figure 2:
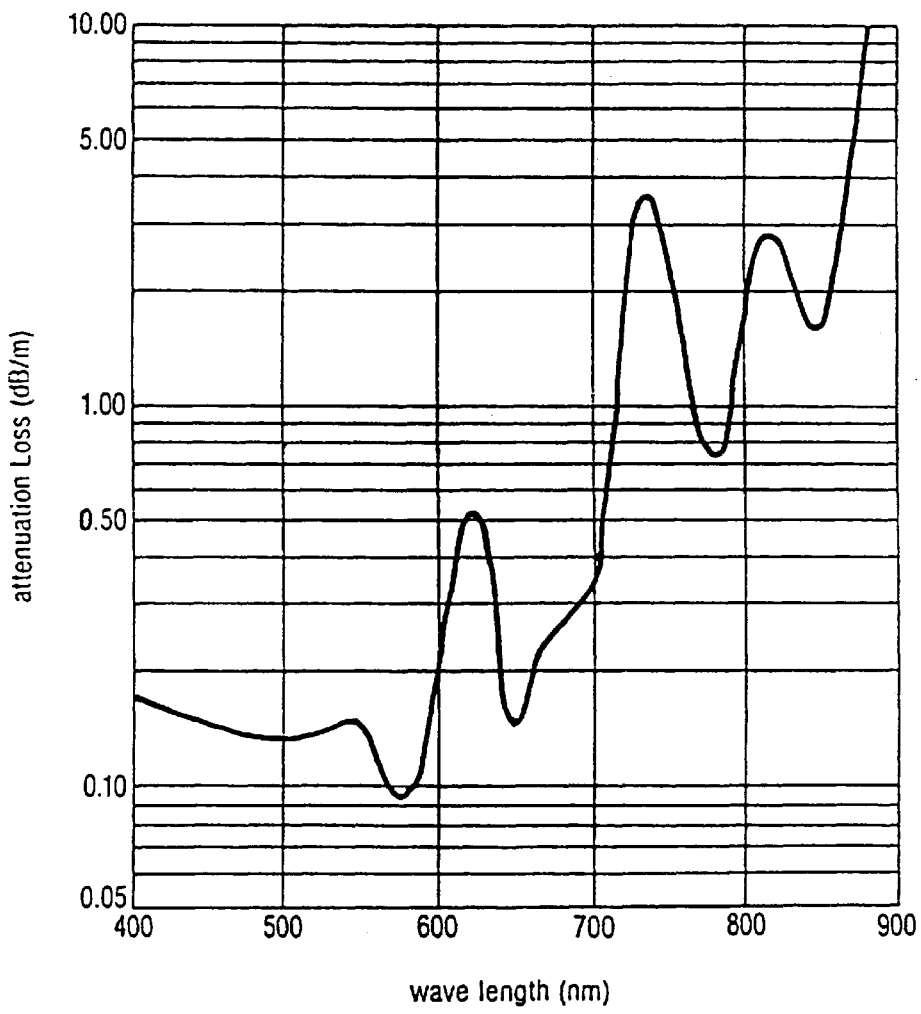
FIGS. 2 show the relationship between the propagation loss and the propagation distance
Figure 2B:
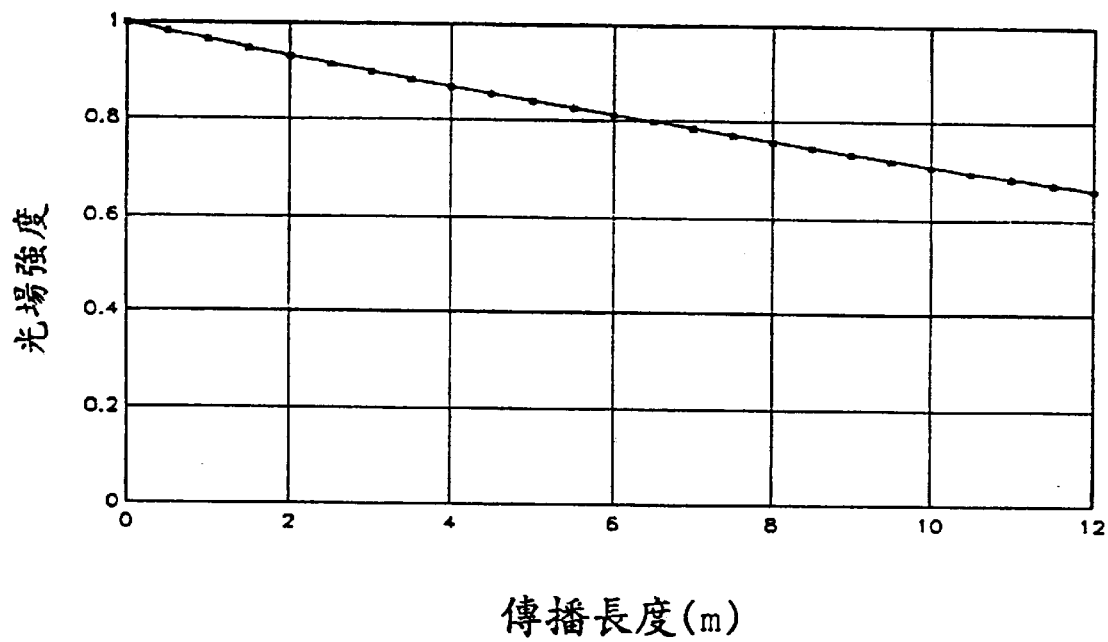
Figure 3A:
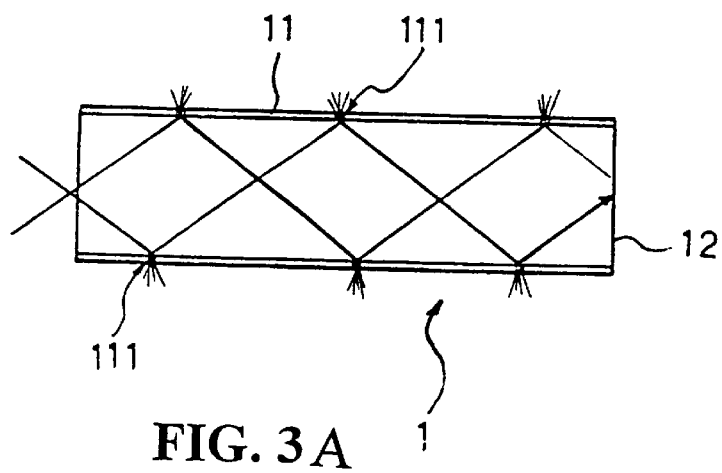
FIGS. 3 are the perspective view of the preferred embodiment of the invention FIG. 4 show the view of another preferred embodiment of the invention.
Figure 4:
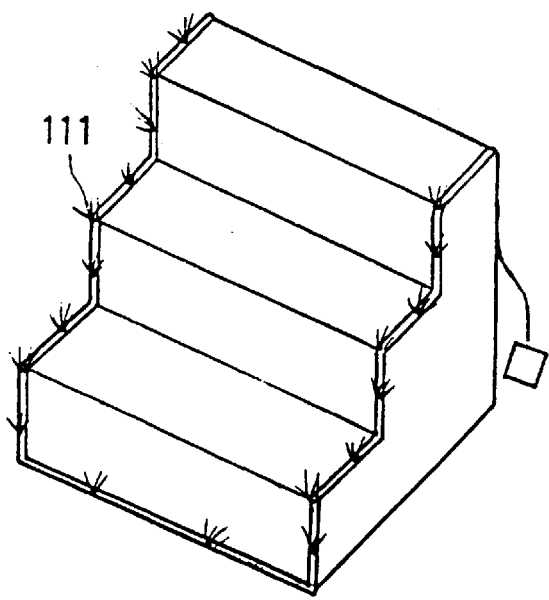
Figure 3B:
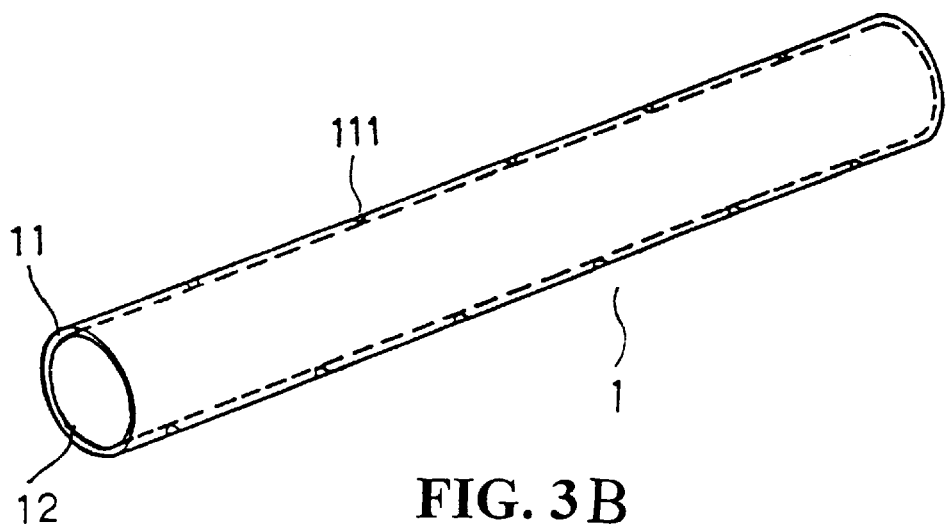
Figure 5:
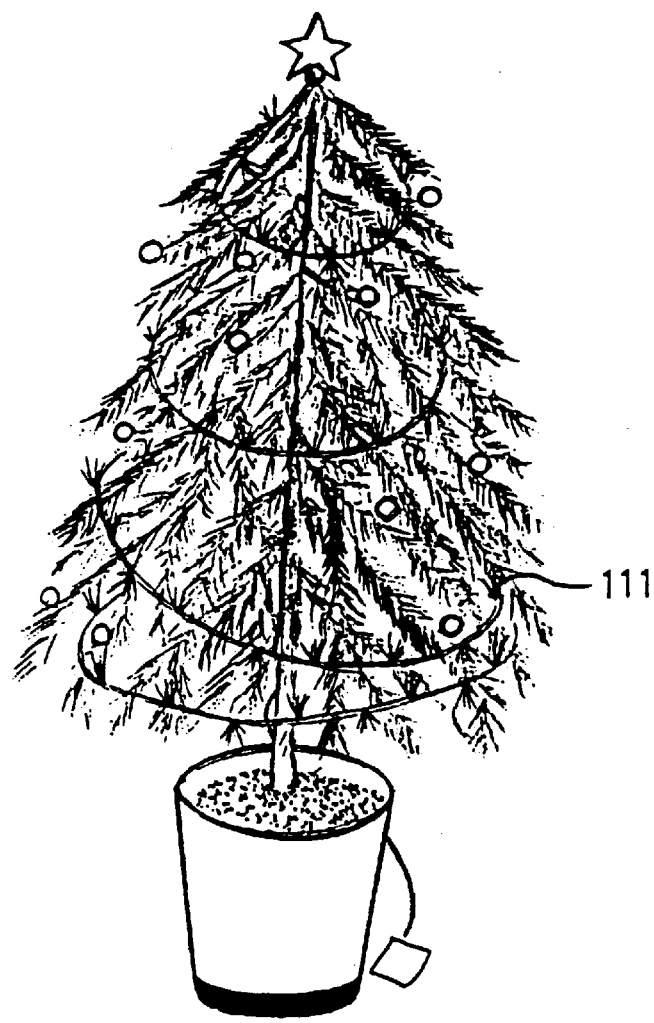
FIG. 5 is the plan view of the another preferred embodiment of the invention.

Now referring to FIG. 3, this figure is a view showing the preferred embodiment of the present invention. A plurality of micro-windows 111 are formed by cutting away a plurality of cladding in the shape of circle or rectangle from the surface of optical fiber 1 with a automatically-controlled and high-precision cutting means. By this process, a plurality of micro-windows which can illuminate the light guided within the core out of the fiber in spot-fashion are formed on the surface of the core. In comparison with the optical fibers that are not subjected to the window-forming process, the fiber having micro-windows can illuminate brighter lighting in radial direction while the propagation loss increases slightly. The thus formed optical fiber, in single-fiber application, can be used in indication purpose. For example, this fiber strip can be attached to both side of the stairs and the light illuminated from those micro-windows can be served as warning sign, as shown in FIG. 4

Figure 6:
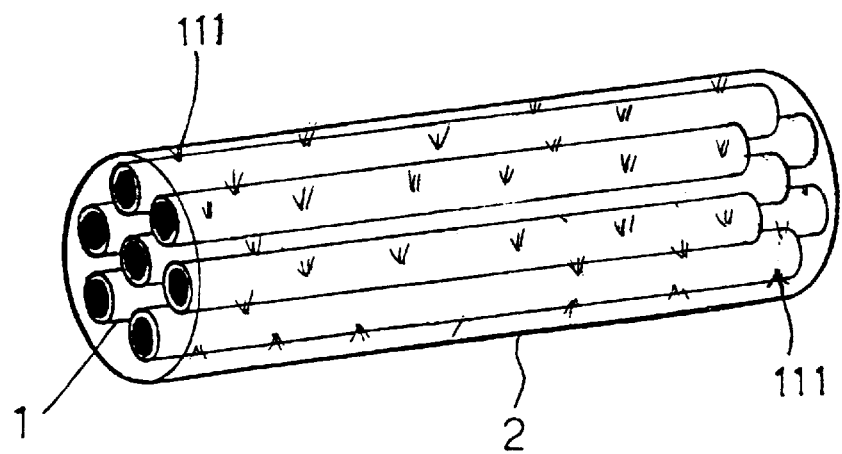
FIG. 6 shows still another preferred embodiment of the invention.

The optical fiber having micro-windows thereupon can also be used in the lighting of Christmas tree. As shown in FIG. 6, A color wheel driven by a motor is arranged in the light source portion, therefore, the light from the light source via the above color wheel can be focused by a convex lens and launched into the fiber. A light with bountiful color can be emitted from the surface of the fiber in the radial direction by the help of the color wheel.

FIG. 6 shows another preferred embodiment of the present invention, a bunch of fibers which have micro-window cut on their surface are incorporate into a transparent and flexible plastic pipe. Because the individual fiber has radial illumination property, this bunch can provide a brighter illumination and wider applications.

While the invention has described in terms of several preferred embodiment, those skilled in the art will realized that the invention can be practiced with modification within the spirit and scope of the appended claims.

I claim:

1. An optical fiber having continuous spot-illumination, said optical fiber comprising:

a core;

a cladding having a smaller refractive index than that of the core;

a plurality of micro-windows formed on the outer surface of the optical fiber by removing a plurality of cladding portion with a predetermined size from the optical fiber at a predetermined distance and exposing the core thereunder, while the sizes and the pitches of the micro-windows not influencing the strength and the illuminating uniformity of the optical fiber;

said optical fiber have a propagation loss of 0–300 dB/km;

a plurality of fiber having continuous illumination spot being incorporated into a transparent and flexible pipe in a manner that the micro-windows of each said optical fiber are staggered from each other to form a fiber cable for lighting purpose.

\* \* \* \* \*